United States Patent
Reh et al.

(10) Patent No.: US 10,706,341 B2
(45) Date of Patent: Jul. 7, 2020

(54) PIECE OF BAGGAGE

(71) Applicant: RIMOWA Electronic Tag GmbH, Hamburg (DE)

(72) Inventors: Jan Reh, Hamburg (DE); Dieter Morszeck, Köln (DE)

(73) Assignee: RIMOWA Electronic Tag GmbH, Hamburg (DE)

( * ) Notice: Subject to any disclaimer, the term of this patent is extended or adjusted under 35 U.S.C. 154(b) by 0 days.

(21) Appl. No.: 15/371,364

(22) Filed: Dec. 7, 2016

(65) Prior Publication Data

US 2017/0103292 A1    Apr. 13, 2017

Related U.S. Application Data

(63) Continuation of application No. PCT/EP2016/063593, filed on Jun. 14, 2016.

(30) Foreign Application Priority Data

Jun. 15, 2015   (EP) .................................. 15172182

(51) Int. Cl.
| | |
|---|---|
| *G06K 19/02* | (2006.01) |
| *A45C 13/42* | (2006.01) |
| *A45C 15/00* | (2006.01) |
| *G06K 7/14* | (2006.01) |
| *G06K 19/06* | (2006.01) |
| *G07B 15/02* | (2011.01) |
| *G09G 5/02* | (2006.01) |

(52) U.S. Cl.
CPC ............ *G06K 19/025* (2013.01); *A45C 13/42* (2013.01); *A45C 15/00* (2013.01); *G06K 7/1413* (2013.01); *G06K 19/06028* (2013.01); *G06K 19/06112* (2013.01); *G07B 15/02* (2013.01); *G09G 5/02* (2013.01); *G09G 2320/0666* (2013.01); *G09G 2320/0686* (2013.01); *G09G 2380/04* (2013.01)

(58) Field of Classification Search
CPC .......... G06K 19/07707; G06K 19/025; G06K 7/10445; G06K 19/06112; A45C 13/001; A45C 13/42

See application file for complete search history.

(56) References Cited

U.S. PATENT DOCUMENTS

| | | |
|---|---|---|
| 2006/0163303 A1 | 7/2006 | Trutanich |
| 2010/0018088 A1 | 1/2010 | Rajpal |

(Continued)

FOREIGN PATENT DOCUMENTS

| | | |
|---|---|---|
| EP | 2737820 A1 | 6/2014 |
| WO | 2012152745 A1 | 11/2012 |

OTHER PUBLICATIONS

International Search Report dated Sep. 14, 2016 in corresponding Application No. PCT/EP2016/063593; 8 pgs.

(Continued)

*Primary Examiner* — Kent W Chang
*Assistant Examiner* — Chayce R Bibbee
(74) *Attorney, Agent, or Firm* — Maier & Maier, PLLC

(57) ABSTRACT

A piece of baggage including a body of the piece of baggage, a display integrated in the body of the piece of baggage and configured as an electronic tag. An indicating area, having flight and personal data required for a flight. The indicating area has a length (A) ranging between 160 and 200 mm and a width (B) ranging between 38 and 60 mm.

12 Claims, 6 Drawing Sheets

(56) References Cited

U.S. PATENT DOCUMENTS

| | | | |
|---|---|---|---|
| 2013/0043080 A1* | 2/2013 | Kritzler | G01G 19/58 |
| | | | 177/132 |
| 2013/0241712 A1* | 9/2013 | Motley, III | G06K 19/0717 |
| | | | 340/10.51 |
| 2014/0291405 A1* | 10/2014 | Harkes | G06K 19/0716 |
| | | | 235/492 |
| 2015/0122893 A1* | 5/2015 | Warther | G06K 7/10366 |
| | | | 235/492 |

OTHER PUBLICATIONS

International Preliminary Report on Patentability dated Dec. 28, 2017 in corresponding Application No. PCT/EP2016/063593; 7 pgs.

* cited by examiner

PIECE OF BAGGAGE

The invention relates to a piece of baggage and a method for operating a display means of a piece of baggage.

In the case of the previously known pieces of baggage which are checked in at an air port for a flight, paper tags, so-called baggage tags, are glued to the piece of baggage, which indicate flight and personal data required for a flight, in particular forwarding routes and identification features.

Of late, it has been intended to provide so-called electronic baggage tags. Tags configured as electronic baggage tags and comprising a display are attached to the piece of baggage.

There is an increasing requirement for indicating more data on these electronic baggage tags and for improving the capability of the baggage tags to be scanned.

It is therefore an object of the present invention to provide a piece of baggage comprising an indicating area for flight and personal data where more data can be indicated in the indicating area and where the capability of scanning is enhanced.

This object is achieved with the features of the disclosure.

According to the invention, the indicating area preferably has a length ranging between 160 and 200 mm and a width ranging between 38 and 60 mm. Thus all flight and personal data required for the flight can be represented such that they are particularly easy to scan.

The display means integrated in the body of the piece of baggage may preferably have a length ranging between 160 and 300 mm and a width ranging between 38 and 90 mm.

The body of the piece of baggage may comprise two longitudinal sides, two main sides as well as an upper and a lower side, wherein the indicating area is arranged in parallel to one of the longitudinal or main sides or to the upper or the lower side, wherein the indicating area is depressed relative to the longitudinal or main side or the upper or lower side and arranged in the body of the piece of baggage. Thus the indicating area is particularly well protected against external influences and the risk of breakage is reduced.

In the indicating area two bar codes of different orientation can be adapted to be indicated. Different orientation means that the bars of the bar codes are arranged in different directions. Preferably, the differently oriented bar codes are arranged in directions offset to one another by 90 degrees. Due to the required size of the indicating area two bar codes of different orientation can be represented besides the necessary flight and personal data. Thus the capability of scanning the flight and personal data represented in the indicating area can be considerably enhanced.

The bar codes are adapted to be indicated side by side in the longitudinal direction of the indicating area.

The display means may be arranged in a well-type take-up element. Hence the risk of breakage of the display means is considerably reduced.

The display means may have a thickness ranging between 7 mm and 40 mm.

The display means may be arranged at one of the longitudinal sides of the body of the piece of baggage. In particular, the longitudinal direction of the indicating area may be arranged in the longitudinal direction of the longitudinal side. In this region the display means is particularly safely arranged.

The display means may comprise a currentless display. The currentless display may preferably be a bistable display. A currentless display is a display which is capable of permanently indicating the data without any current supply. Current is merely needed for altering the indication. Such displays are also referred to as bistable displays. For supplying the display with current for altering the indication at least one battery may be provided.

The display means may comprise a housing, a protective layer as well as a display, wherein the display is arranged inside the housing and is protected by the protective layer.

At the display means two green strips arranged in parallel at a distance to each other may be adapted to be indicated in defined sections in the indicating area.

Thus a piece of baggage may be provided which comprises a display means configured as an electronic tag, said display means being also suitable for indicating flight and personal data required for inner-European flights.

According to the present invention, the additional information whether an inner-European or a non-European flight is concerned can be represented.

Green color and/or green material may be arranged on or in the display and/or on or in the protective layer, wherein the display means comprises a first and a second operating state, wherein in the first operating state the green strips are visible and in the second operating state the green strips are not visible.

The green strips may each have such a length that they cannot be arranged in those regions where the bar codes are represented in the indicating area.

Preferably, the protective layer may be a transparent protective layer which is arranged on the display. In the present case transparent means that the protective layer is transparent to such an extent that the indication of the display arranged below it is visible as a well-defined representation. The material of the transparent protective layer must thus be largely permeable to radiation of the visible spectrum.

The protective layer may be made of glass or a plastic material.

In the first operating state the display of the display means may indicate in white in the region of the indicating area where the green strips are adapted to be indicated, such that the green color and/or the green material arranged in the region of the green strips are visible.

In the second operating state the display of the display means may indicate in black in the region of the indicating area where the green strips are adapted to be indicated, such that the green color and/or the green material arranged in the region of the green strips are not visible.

The green strips may each have a width of at least 5 mm.

The flight and personal data may comprise forwarding routes and identification features, wherein the green strips each have such a length that they are adapted to be positioned at least in the regions for indicating the forwarding route and the identification features.

According to the present invention, a method for operating a display means of a piece of baggage may be provided, said piece of baggage comprising a body of the piece of baggage and a display means integrated in the body of the piece of baggage and configured as an electronic tag, wherein in an indicating area of the display means flight and personal data required for a flight can be indicated. Preferably, it is provided that the indicating area has a length in the longitudinal direction ranging between 160 and 200 mm and a width in the transverse direction ranging between 38 and 60 mm, wherein two bar codes of different orientation can be indicated in the indicating area. Preferably, the two bar codes are indicated side by side in the longitudinal direction in the indicating area.

Preferably, it is further provided that in a first operating state green strips are indicated in the indicating area of the display means and in a second operating state no green strips are indicated in the indicating area of the display means.

In the first operating state the display of the display means can indicate in white in the region corresponding to the region of the green strips of the indicating area of the display means such that green strips become visible in the indicating area of the display means.

In the second operating state the display of the display means can indicate in black in the region corresponding to the region of the green strips in the indicating area of the display means such that the green strips are not visible in the indicating area of the display means.

The green strips having a length of at least 5 mm may be indicated at the longitudinal edges of the indication area of the display means, wherein the green strips are indicated in the longitudinal direction along the longitudinal edge only in those regions which are provided for indicating the forwarding routes and the identification features.

Hereunder exemplary embodiments of the invention are illustrated in detail with reference to the drawings.

Figure 5:
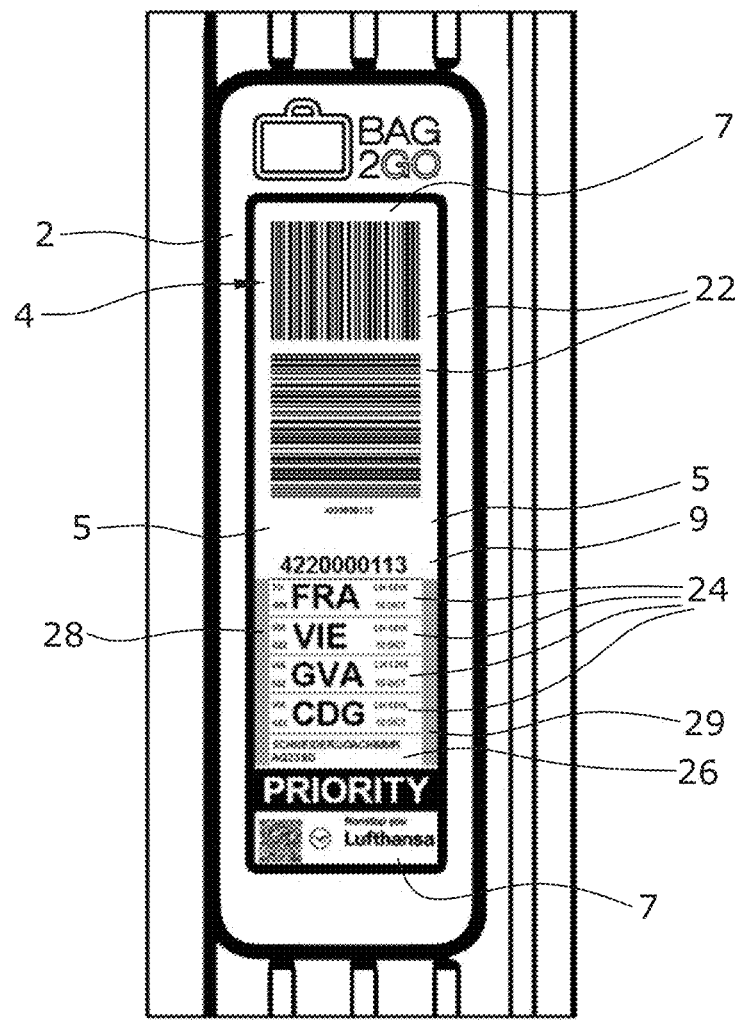
Figure 6:
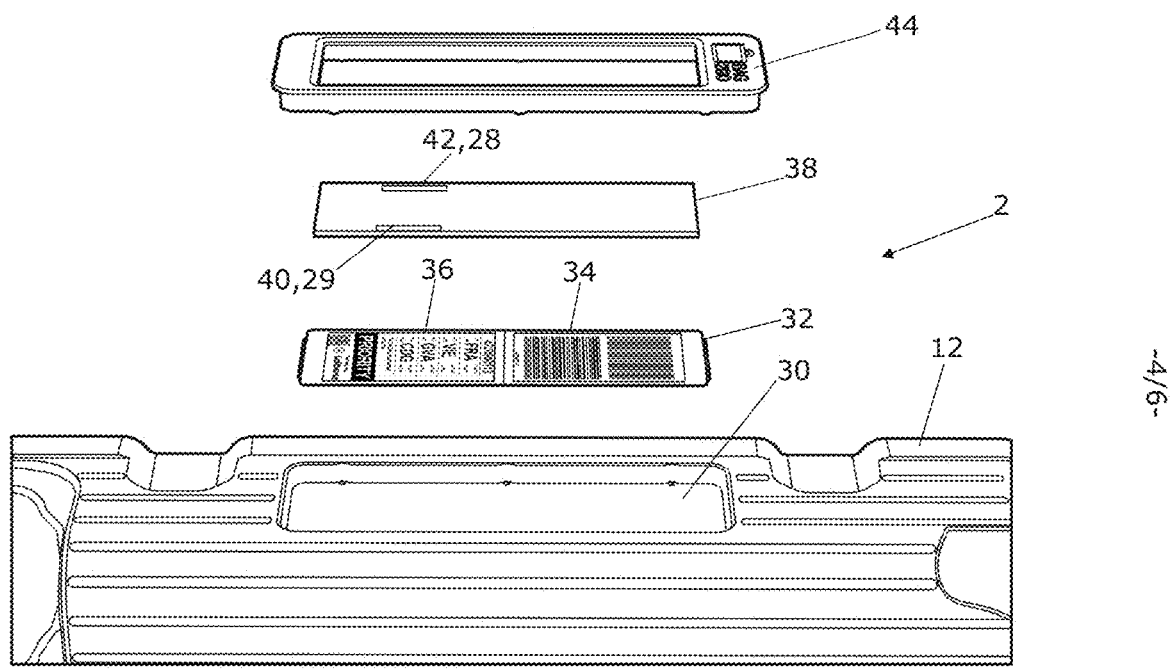
Figure 7:
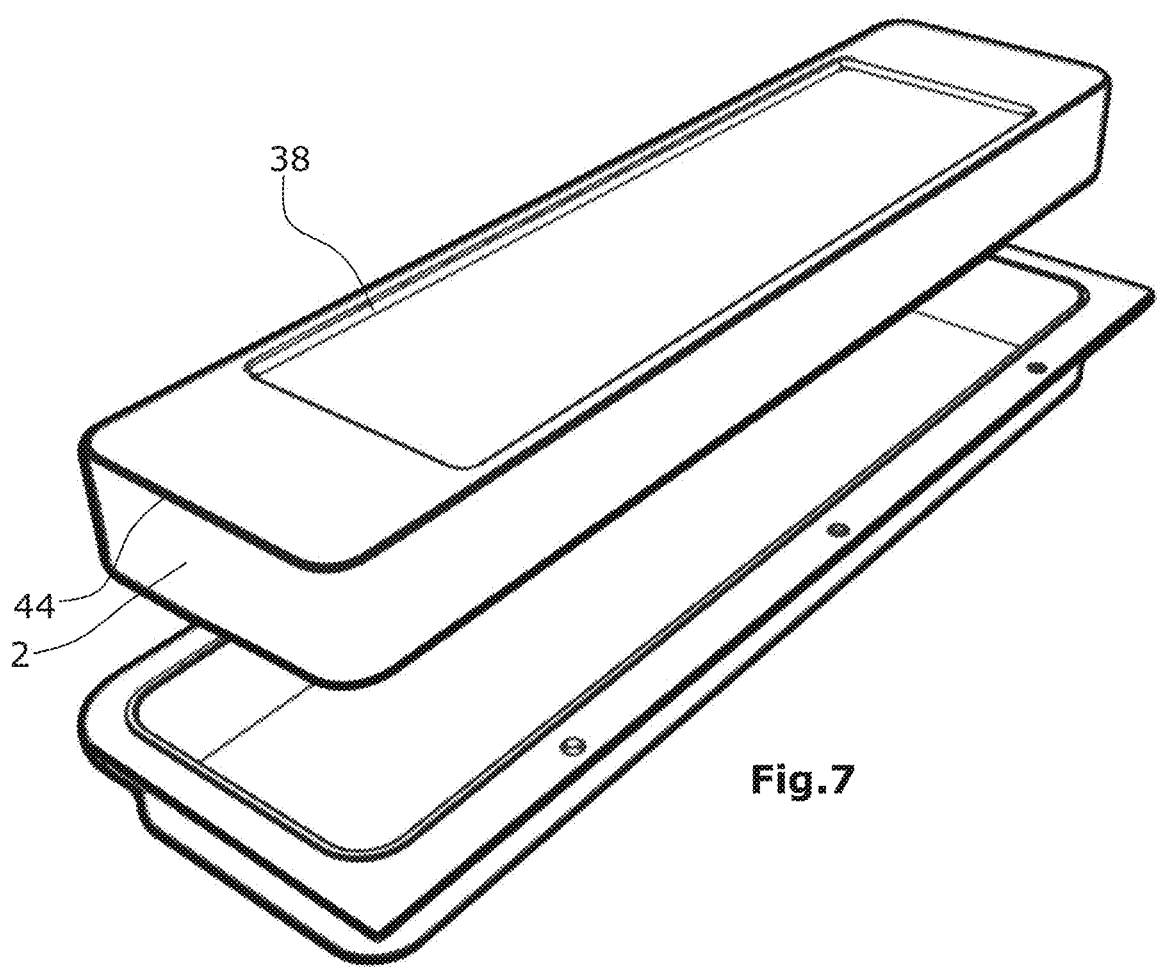
Figure 8:
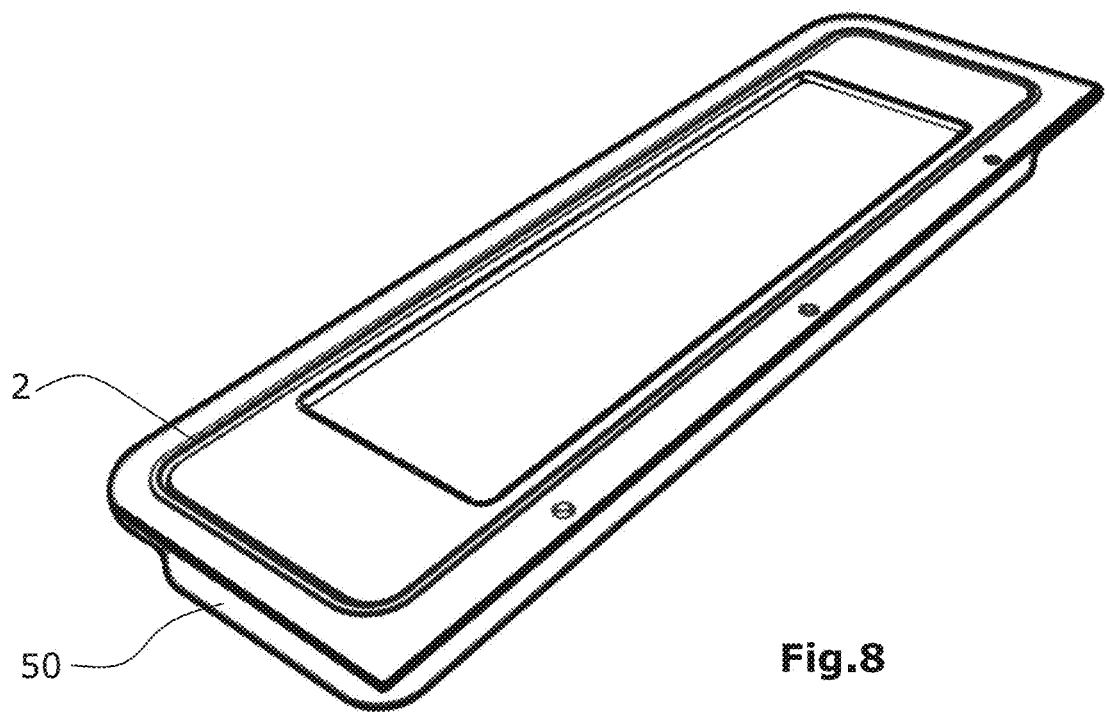
Figure 9:
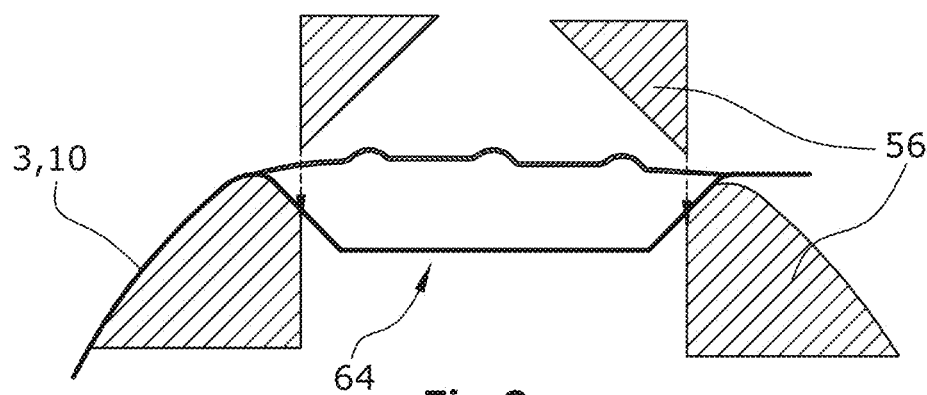
Figure 10:
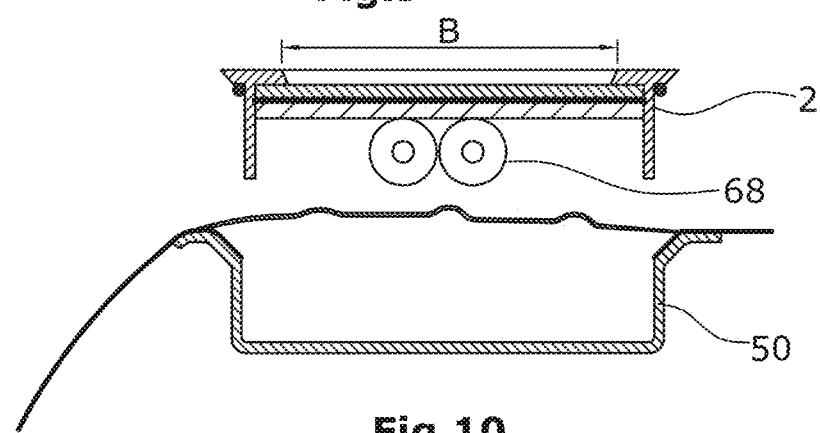
Figure 11:
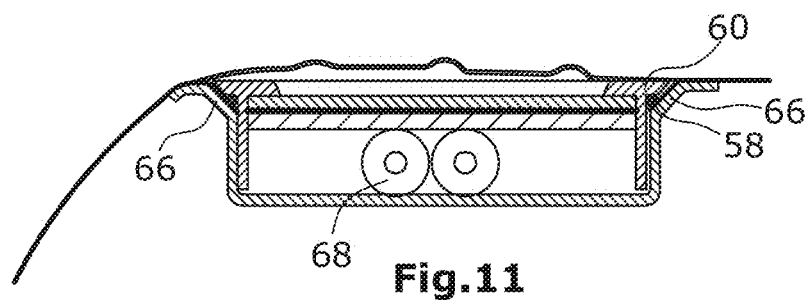
Figure 12:
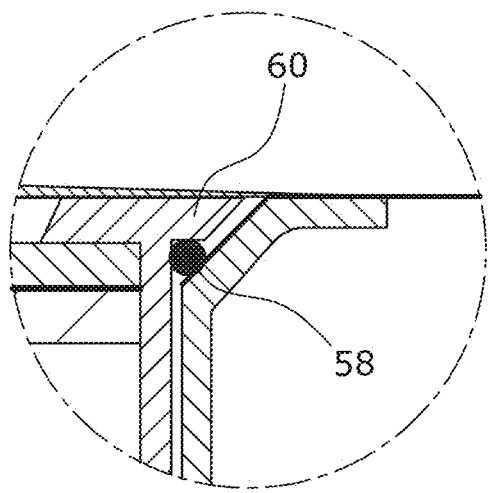

FIG. 5 shows a top view of a display means integrated in the body of the piece of baggage, FIG. 6 shows an exploded view of a display means, FIG. 7 shows a display means with a take-up element, FIG. 8 shows the take-up element of FIG. 7 with the display means inserted, FIG. 9 shows a suitcase shell with a deep-drawn region, FIG. 10 shows a suitcase shell with a take-up element, FIG. 11 shows a suitcase shell with a take-up element, and FIG. 12 shows a suitcase shell with a take-up element.

Figure 1:
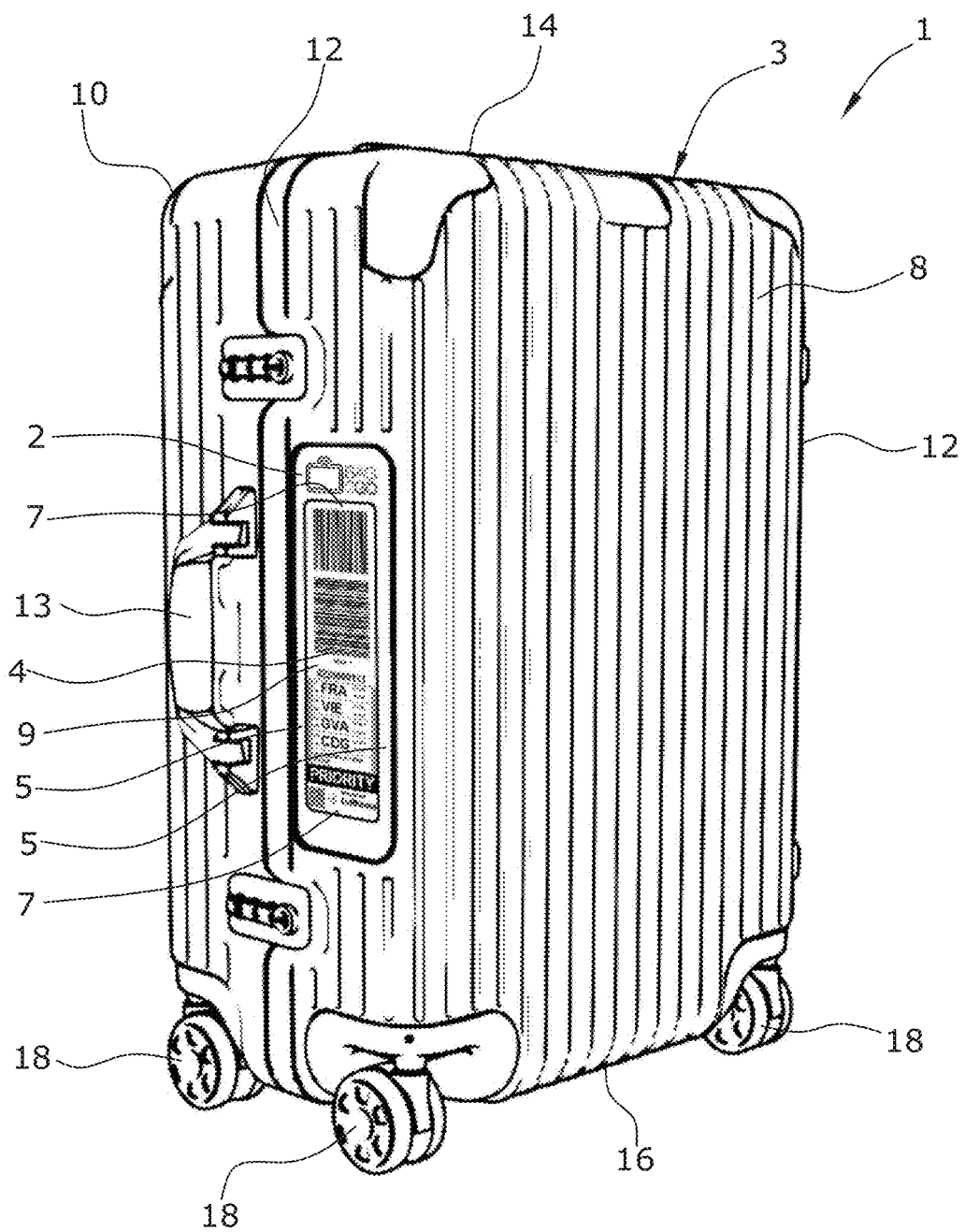
FIG. 1 shows a piece of baggage according to the present invention.

FIG. 1 shows a piece of baggage 1 according to the present invention. Preferably, the piece of baggage 1 is a suitcase, as in the illustrated exemplary embodiment. The piece of baggage 1 comprises a body 3 of the piece of baggage. In the body 3 of the piece of baggage an integrated display means 2 configured as an electronic tag is arranged. The display means 2 comprises a preferably square indicating area 4, preferably including two longitudinal edges 5 and two transverse edges 7. In the indicating area 4 flight and personal data 22, 24, 26, 28, 29, in particular forwarding routes and identification features 24, 29, required for a flight are adapted to be indicated.

The piece of baggage 1 configured as a suitcase comprises a body 3 of the piece of baggage. The body 3 of the piece of baggage is composed of a first and a second shell of the suitcase 10, 12. The body 3 of the piece of baggage comprises a main surface 8, two longitudinal sides 12, an upper side 14 and a lower side 16. At the lower side 16 a roller 18 each is arranged preferably at the corners. Preferably, four rollers 18 are arranged at the lower side 16. Via the rollers 18 the piece of baggage 1 can be moved on a ground.

Preferably, the integrated display means 2 is arranged at one of the longitudinal sides 12. Preferably, the display means 2 is arranged at that longitudinal side 12 where a handle element 13 is disposed. This offers the advantage that the flight and personal data 22, 24, 26 adapted to be indicated in the indicating area 4 of the display means 2 are arranged in the region of the handle 13. Up to now it has been common practice to attach the previously used paper baggage tag at this handle 13. It is of advantage to both the airport personnel and the scanner of the forwarding means for pieces of baggage in airports that the electronic tag is thus attached at the usual place such that the process of forwarding baggage at airports need not be changed.

Figure 2:
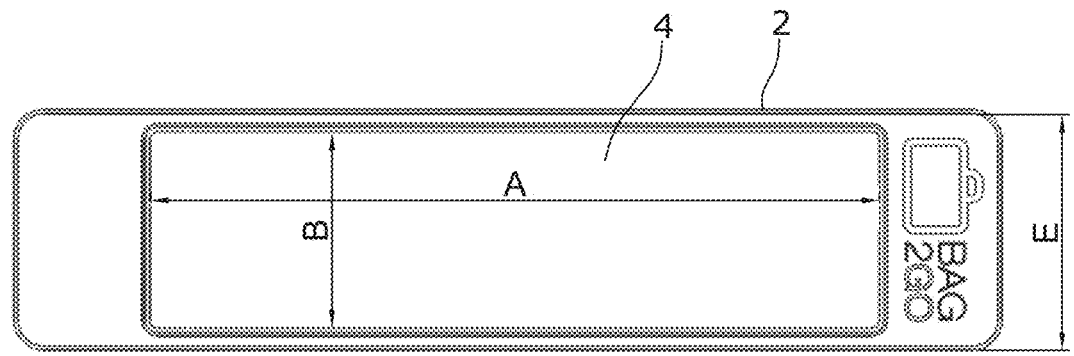
FIG. 2 shows a top view of the display means.
Figure 3:
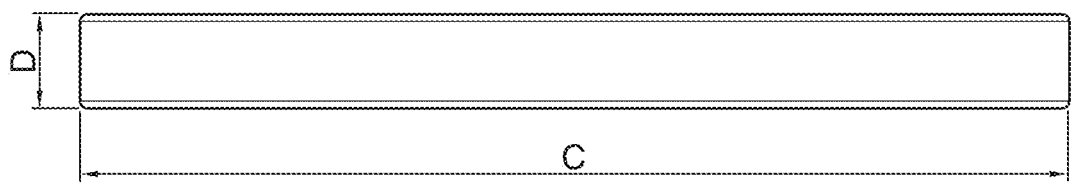
FIG. 3 shows a side view of the display means of FIG. 2.

FIG. 2 shows a top view of the display means 2. The display means 2 comprises a housing 44 and an indicating area 4. In the longitudinal direction the indicating area 4 has a length A ranging between 160 and 200 mm. Further, in the transverse direction the indicating means 4 has a width B ranging between 38 and 90 mm. The display means 2 has a length C and a width E. The length C is preferably a length ranging between 160 and 300 mm, whereas the width E of the display means is a width of preferably 38 to 90 mm. The thickness D of the display means is illustrated in FIG. 3 and preferably ranges between 7 and 30 mm. The thickness D is dimensioned such that common AA batteries can be used as batteries.

Figure 4:
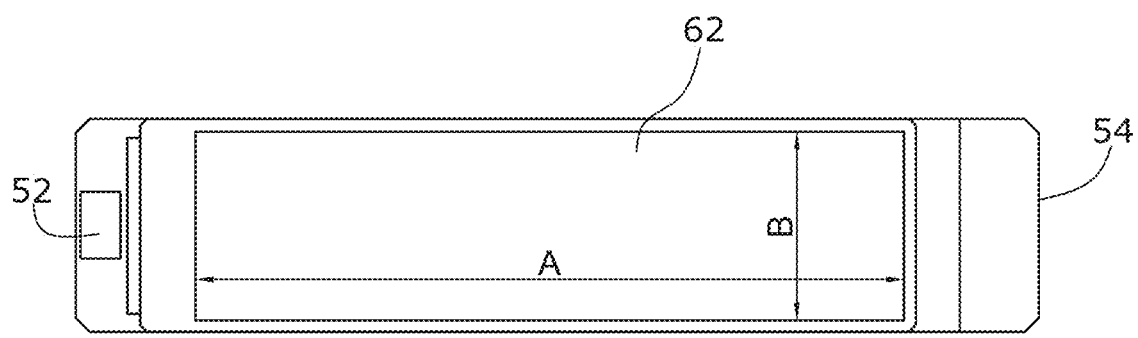
FIG. 4 shows a top view of the display of the display means.

FIG. 4 illustrates the top view of the display 62 of the display means 2. The display 62 comprises an indicating area 4. Next to the indicating area 4 the display means 2 offers a respective space for sensors 52 and 54 such that the sensors 52 and 54 can be arranged on the surface of the display means 2. The sensors 52 and 54 may be Bluetooth or RFID chips. Preferably, the housing 44 may be made of a plastic material such that the sensors arranged on the surface of the display means 2 have good reception.

In FIG. 5 a detail of the piece of baggage 1 showing the display means 2 is illustrated. In the indicating area 4 of the display means 2 the flight and personal data 22, 24, 26, 28 and 29 required for the flight are represented. In the indicating area 4 two bar codes 22 of different orientation are indicated. Different orientation means that the bars of the bar code are arranged in different directions. In the illustrated exemplary embodiment, the bars of the bar code are arranged in directions offset to one another by 90 degrees. Due to the length of the indicating area ranging between 160 and 200 mm and the width ranging between 38 and 60 mm the two differently oriented bar codes can be represented with an adequate size next to the other flight and personal data 24, 26, 28 and 29 required for the flight. Adequate size means that automatic scanners provided at airports for forwarding baggage are capable of scanning the bar codes with a success rate of at least 90 percent. Due to the fact that the bar codes are differently oriented these bar codes can be scanned by all automatic scanners, irrespective of how the piece of baggage is arranged relative to the scanners. Preferably, the two bar codes comprise identical data. That is, when these data are read, preferably identical data are read from the bar codes.

In FIG. 5 it can be clearly seen that at the display means two green strips 28, 29 arranged in parallel at a distance to each are adapted to be indicated in the indicating area 4, in particular at the longitudinal edges 5. The flight and personal data 22, 24, 26 comprise in particular forwarding routes 24 and identification features 26.

Preferably, the green strips have such a length that they are adapted to be positioned at least in the regions designed for the indication of the forwarding routes 24 and identification features 26. Preferably, the green strips are not arranged in those regions where the bar codes 22 are disposed. Preferably, the green strips 28, 29 have a width of at least 5 mm.

In FIG. 6 the display means 2 is shown in greater detail. FIG. 6 shows that the display means 2 comprises at least one display 32 and at least one transparent protective layer 38. Preferably, the display 32 is configured as a currentless display. The display means 2 may further comprise the housing 44, as in the present exemplary embodiment. The display means 2 may be arranged in a well-type take-up element 30 in the body 3 of the piece of baggage, as in the present exemplary embodiment. The display means 2 may comprise a plurality of transparent protective layers 38.

In the present exemplary embodiment, the transparent protective layer 38 is arranged at that side of the display 32 where the indicating areas 34, 36 are disposed. In the present exemplary embodiment, the display 32 comprises a first and a second indicating area 34, 36. In the present exemplary embodiment, green color and/or a green material 42, 40 are arranged on the protective layer 38 in the region corresponding to that region where the green strips 28, 29 are adapted to be indicated in the indicating area 4.

The green color may be arranged on the side of the protective layer facing the display 32 and/or on the side facing the housing 44. Alternatively, green color may be introduced into the protective layer 38. Alternatively, green material may be introduced onto or into the protective layer 38. The green material may further be a green adhesive strip, for example, which is attached to the protective layer 38. Alternatively, green color and/or a green material may be arranged on or in the display 32 in the region corresponding to that region where the green strips 28, 29 are adapted to be indicated in the indicating area 4. The green color and/or the green material need merely be arranged such that the display 32 arranged below is capable of indicating in white or black. In the present case below always means the direction towards the body of the piece of baggage, and in the present case above always means the direction away from the body of the piece of baggage.

The display means 2 may have a first and a second operating state, wherein in the first operating state the green strips 28, 29 are visible and in the second operating state the green strips 28, 29 are not visible.

In the first operating state the display 32 of the display means 2 indicates in white in that region of the indicating area where the green strips 28, 29 are visible. In this case the green color and/or the green material 40, 42 which are arranged in the region of the green strips 28, 29 become visible. Thus the green strips 28, 29 are shown in the indicating area 4. White merely means a bright color.

In a second operating state the display 32 of the display means may indicate in black in that region of the indicating area 4 where the green strips 28, 29 are adapted to be indicated. In this case the green color and/or the green material 40, 42 which are arranged in the region of the green strips 28, 29 do not become visible. In the second operating state the indicating area 4 merely indicates black bars and no green strips 28, 29. Black merely means a dark color.

The display 32 can be operated by a battery not shown or an accumulator not shown. This battery or the accumulator may also be arranged in the depression 30 in the body 3 of the piece of baggage. Alternatively, they may be arranged inside the body 3 of the piece of baggage and merely be connected with the display means 2.

The display 32 may be made of a plastic material such that it is flexible. The protective layer 38 may be made of glass and/or a plastic material.

FIG. 7 shows the display means 2 and a take-up element 50. In contrast to FIG. 6 where the take-up element 30 is deep-drawn in the body of the piece of baggage, the take-up element 50 illustrated in FIG. 7 is a separate component. Preferably, this well-type take-up element 50 may be made of a plastic material.

Alternatively, the take-up element 50 may be made from any other material. The display means 2 comprises a housing 44 and a protective layer 38. Inside the housing 44 a display is arranged. The housing 44 and the protective layer 38 protect the display arranged inside against impacts, bending, water and dust. The housing 44 and the protective layer 38 may form a closed system. This offers the advantage that it is very difficult to tamper with a display.

The display means 2 may be arranged in the take-up element 50. The display means 2 may be accommodated in the take-up element such that the display means 2 is arranged in the take-up element 50 in a slightly depressed manner such that the display means 2 is better protected against external influences.

In FIG. 8 the take-up element 50 of FIG. 7 is illustrated with the display means 2 arranged therein.

In FIGS. 9 to 12 various method steps are illustrated, wherein a take-up element 50 can be connected with the first or the second suitcase shell 10 of the body 3 of the piece of baggage. In FIG. 9 a suitcase shell 10 is illustrated which comprises a deep-drawn region 64. This deep-drawn region 64 is stamped out with the aid of stamping tools 56.

A take-up element 50 similar to the take-up element of FIGS. 7 and 8 is connected, preferably glued, from below to the suitcase shell 10, as illustrated in FIG. 10. For this purpose, the take-up element 50 comprises protruding edges 66. The display means 2 is then inserted from above into the take-up element 50. The display means 2 may be screwed from below through the take-up element 50 to the take-up element 50. During the screwing process a circumferential edge of the display means 2 is pressed against the suitcase shell 10. A seal 58 arranged at the circumferential edge of the display means 2 is pressed against the suitcase shell thus sealing the display means in an interference fit.

The take-up element 50 may comprise a compartment in its lower region, which can be opened for inserting the batteries 68. Further, a recess may be provided in the take-up element 50 for actuating a mechanical actuating means at the display means 2. This may be a button at the display means 2, for example. This actuating means may be actuated for activating the display means for the purpose of transmitting flight and personal data to the display means.

The invention claimed is:

1. A piece of baggage, comprising:
    a body of the piece of baggage;
    a display connected to the body of the piece of baggage and configured as an electronic tag and having an indicating area, wherein flight and personal data required for a flight are adapted to be indicated in the indicating area;
    wherein the body of the piece of baggage includes a take-up element having a protective layer disposed within a housing, the housing configured to mechanically interface with an enclosed internal cavity of the take-up element via an interference fit, wherein the take-up element is made of plastic;
    wherein the take-up element is configured to receive the display within the enclosed internal cavity; and
    wherein a button is arranged at the display, wherein the button is configured to activate the display and transmit the flight and personal data to the display upon actuation of the button.

2. The piece of baggage according to claim 1, wherein the display connected to the body of the piece of baggage has a length (C) ranging between 160 and 300 mm and a width (E) ranging between 38 and 90 mm.

3. The piece of baggage according to claim 1, wherein the body of the piece of baggage comprises: two longitudinal sides, two main sides as well as an upper and a lower side, wherein the indicating area is arranged in parallel to one of the longitudinal or main sides or the upper or lower side, wherein the indicating area is depressed relative to the longitudinal or main side or the upper or lower side in the body of the piece of baggage.

4. The piece of baggage according to claim 1, wherein one or more bar codes are adapted to be indicated side by side in the longitudinal direction of the indicating area.

5. The piece of baggage according to claim 1, wherein the display has a thickness ranging between 7 mm and 40 mm.

6. The piece of baggage according to claim 1, wherein the display is arranged at one of the longitudinal sides of the body of the piece of baggage.

7. The piece of baggage according to claim 1, wherein the display further comprises a currentless display, wherein the currentless display is a bistable display.

8. The piece of baggage according to claim 1, wherein at the display two green strips arranged in parallel at a distance to each other are adapted be indicated in defined sections in the indicating area.

9. The piece of baggage according to claim 8, wherein a green color and/or green material are arranged on or in the display and on or in the protective layer, wherein the display further comprises a first and a second operating state, wherein in the first operating state the green strips are visible and in the second operating state the green strips are not visible.

10. The piece of baggage according to claim 8, wherein the green strips each have such a length that they are not adapted to be arranged in the regions where the bar codes are represented in the indicating area.

11. A method for operating a display of a piece of baggage which comprises a body of the piece of baggage and a display connected to the body of the piece of baggage, the display configured as an electronic tag and having an indicating area, wherein the body of the piece of baggage includes a take-up element having a protective layer disposed within a housing, the housing configured to mechanically interface with an enclosed internal cavity of the take-up element via an interference fit, wherein the take-up element is made of plastic wherein the take-up element is configured to receive the display within the enclosed internal cavity, and wherein a button is arranged at the display, wherein the button is configured to activate the display and transmit the flight and personal data to the display upon actuation of the button.

12. The method according to claim 11, wherein in a first operating state green strips are indicated in the indicating area of the display, and in a second operating state no green strips are indicated in the indicating area of the display.

\* \* \* \* \*